Jan. 17, 1961 W. W. DOWNS 2,968,322
LOOM PICKER
Filed April 30, 1958
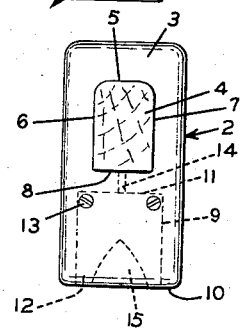
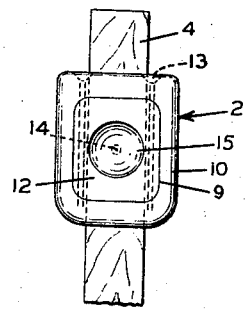
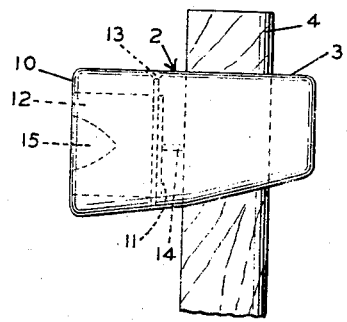
INVENTOR
WILLIAM W. DOWNS
ATTORNEY

United States Patent Office 2,968,322
Patented Jan. 17, 1961

2,968,322

LOOM PICKER

William W. Downs, East Hempfield Township, Lancaster County, Pa., assignor to Armstrong Cork Company, Lancaster, Pa., a corporation of Pennsylvania Filed Apr. 30, 1958, Ser. No. 731,967

2 Claims. (Cl. 139—159)

This invention relates to a loom picker. It is concerned more particularly with a loom picker in which the body or shell portion is formed of a material which is not subject to dimensional change to any substantial degree upon exposure to the high humidity conditions encountered in textile weave rooms and carries an insert in the forward end for engagement with the point of the shuttle, the insert being formed of a material having excellent shock-absorbing and wear-resisting properties.

Loom pickers made from a polyvinyl alcohol composition as disclosed in Baymiller Patent 2,750,348 have been found to be extremely shock-resistant and in service have had a long, useful life because of exceptional properties of wear resistance.

It is an object of the present invention to take advantage of this shock and wear resistance of polyvinyl alcohol material in the fabrication of a loom picker from a body or casing of polyurethane material which is dimensionally stable even under the high humidity conditions encountered in textile weave rooms.

Another object of the invention is to provide a loom picker of the type described above in which the polyvinyl alcohol insert will be arranged in the polyurethane body or shell in such manner that the same may be removed easily and replaced when worn out.

In order that the invention may be readily understood, an embodiment thereof will be described in conjunction with the attached drawing, in which:

Figure 1 is a top plan view of the picker of the invention;

Figure 2 is a front elevational view of the picker shown in Figure 1; and

Figure 3 is a side view of the picker shown in Figure 1.

Referring to the drawing, the picker comprises a body or shell 2 which has a loop portion 3 for attachment to a picker stick 4. The loop portion 3 includes a rear wall 5, side walls 6 and 7, and a forward wall 8.

A generally rectangular recess 9 is provided in the forward wall 10 of the body or shell 2. The recess 9 terminates in a base wall 11 spaced from the wall 8.

A shuttle point engaging insert 12 is provided. This insert is molded to fit tightly within the recess 9 and to engage the walls thereof, including the base wall 11. As shown in the drawings, the side walls of the recess are continuous with and imperforate immediately adjacent base wall 11. When so positioned, the insert is frictionally engaged by the material of the body or shell 2 and may be held in place therein by screws 13 or other mechanical fasteners.

As shown in Figure 1, a small passageway 14 extends from the loop opening in the body or shell to the cavity 9, extending from wall 8 to base wall 11. This opening is provided to permit removal of the insert 12 by the application of air or other fluid under pressure to the insert in the cavity 9. This may be accomplished by removing the picker from the picker stick 4 and with a suitable nozzle injecting air into the opening 14. The forward end of the insert is preferably provided with a shuttle point guide opening 15.

The body or shell 2 is made of polyurethane material. The polyurethane elastomers are well known. Mueller Patent 2,620,516, of December 9, 1952, discloses a method of producing rubberlike materials which may be cast in molds. The compositions disclosed in this patent are typical of the many polyurethane compositions, isocyanate-modified polyesters, which may be used in the body or shell 2. The composition of Example 1 of that patent, for example, will form a suitable body or shell portion for a picker. Other patents disclosing isocyanate-modified polyesters which are also incorporated herein by reference are: 2,729,618; 2,621,166; and 2,778,810.

The insert is made of a molded polyvinyl alcohol composition. The following composition, which is the one disclosed in Baymiller Patent 2,750,348, is suitable:

*Example I*

| | Parts by weight |
|---|---|
| Polyvinyl alcohol | 100 |
| Glycerine | 60 |
| Magnesium stearate | 2 |
| Water | 50 |
| Titanium dioxide | 5 |

The preparation of the molding composition and the molding of the insert may be effected as disclosed in the Baymiller patent. This patent discloses the desired proportioning of the various components, substitutes which may be made therein, and other details. The Baymiller patent is incorporated herein by reference.

The body 2 may be cast and the insert 12 may be injection molded. The insert 12 is forced into position within the opening 9 provided for it in the body 2, and the fastenings 13 are inserted. The picker is then ready for assembly on a picker stick 4.

I claim:

1. In a loom picker, the combination with a picker stick of a shuttle picker comprising a body and loop portion of resilient material for attachment to the picker stick, said body having a recess disposed in the forward end of said body and separated from the open end of said loop portion by a base wall, said recess having side walls continuous with and imperforate immediately adjacent said base wall, and a replaceable molded shuttle point engaging insert frictionally fitted into said recess and held therein by the resiliency of said body material, said base wall having an orifice therein connecting said recess with said open end of said loop portion for the application of fluid under pressure to said insert to remove the same from within said recess for replacement when worn.

2. In a loom picker, the combination with a picker stick of a shuttle picker comprising a body and loop portion of yielding rubberlike polyurethane material for attachment to the picker stick, said body having a recess disposed in the forward end of said body and separated from the open end of said loop portion by a base wall of polyurethane material, said recess having side walls continuous with an imperforate immediately adjacent said base wall, and a replaceable molded shuttle point engaging insert of polyvinyl alcohol frictionally fitted into said recess and held therein by the resiliency of said polyurethane material, said base wall having an orifice therein connecting said recess with said open end of said loop portion for the application of fluid under pressure to said insert to remove the same from within said recess for replacement when worn.

References Cited in the file of this patent

UNITED STATES PATENTS

| | | |
|---|---|---|
| 2,549,394 | Shivell et al. | Apr. 17, 1951 |
| 2,705,025 | Bell | Mar. 29, 1955 |
| 2,750,348 | Baymiller | June 12, 1956 |

OTHER REFERENCES

"3 New Foams," Modern Plastics, vol. 30, No. 8, April 1953, pages 85–87. (Copy available in Division 50.)